Aug. 1, 1961  H. KOSMAN  2,994,392
COMBINED STEERING AND DRIVE UNIT FOR TRACTOR WHEELS
Filed April 2, 1956  6 Sheets-Sheet 1

Henry Kosman
INVENTOR.

BY Clarence A. O'Brien
and Harvey B. Jackson
Attorneys

Aug. 1, 1961 H. KOSMAN 2,994,392
COMBINED STEERING AND DRIVE UNIT FOR TRACTOR WHEELS
Filed April 2, 1956 6 Sheets-Sheet 3

Henry Kosman
INVENTOR.

BY *Clarence A. O'Brien
and Harvey B. Jacobson*
Attorneys

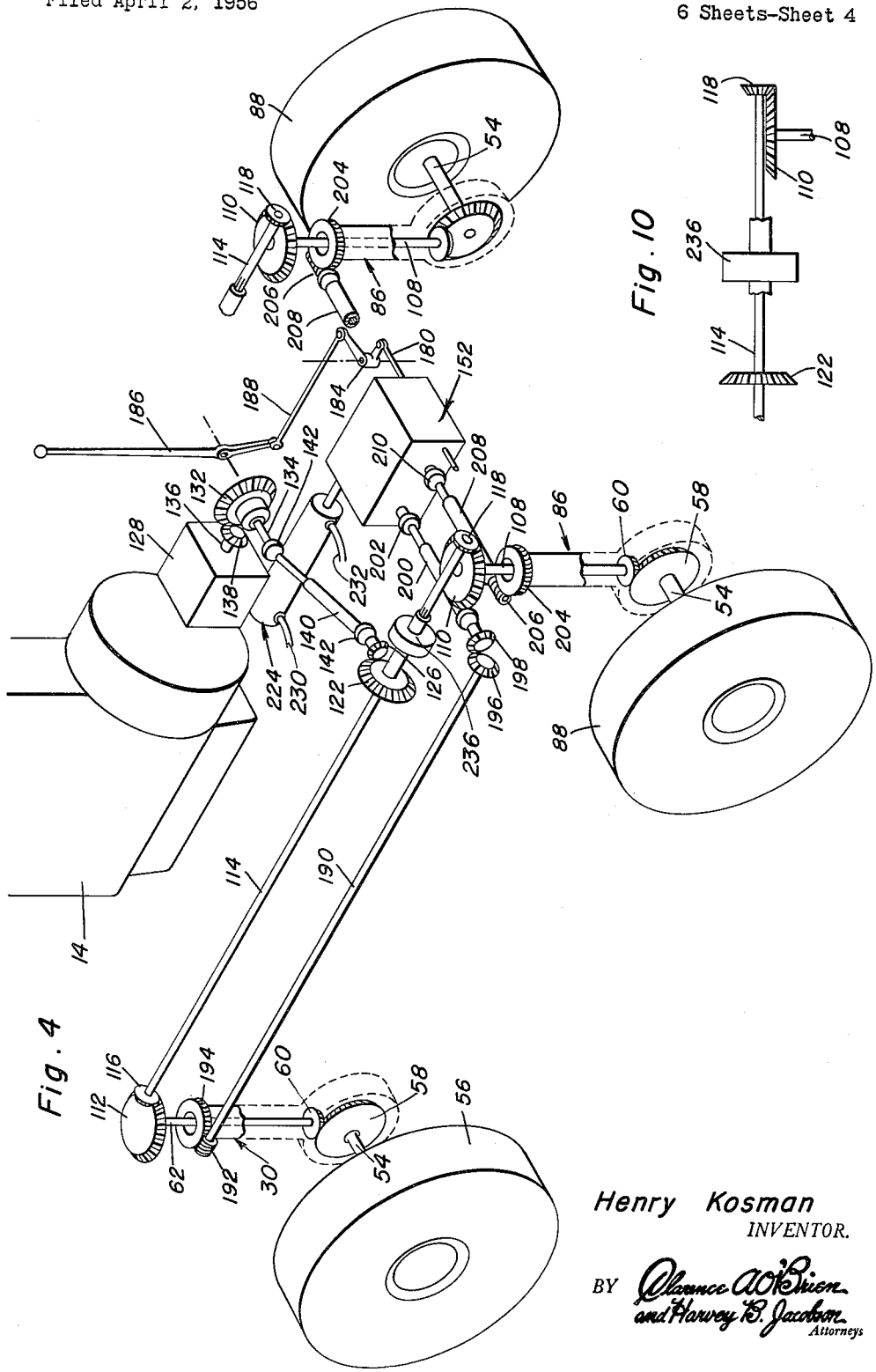

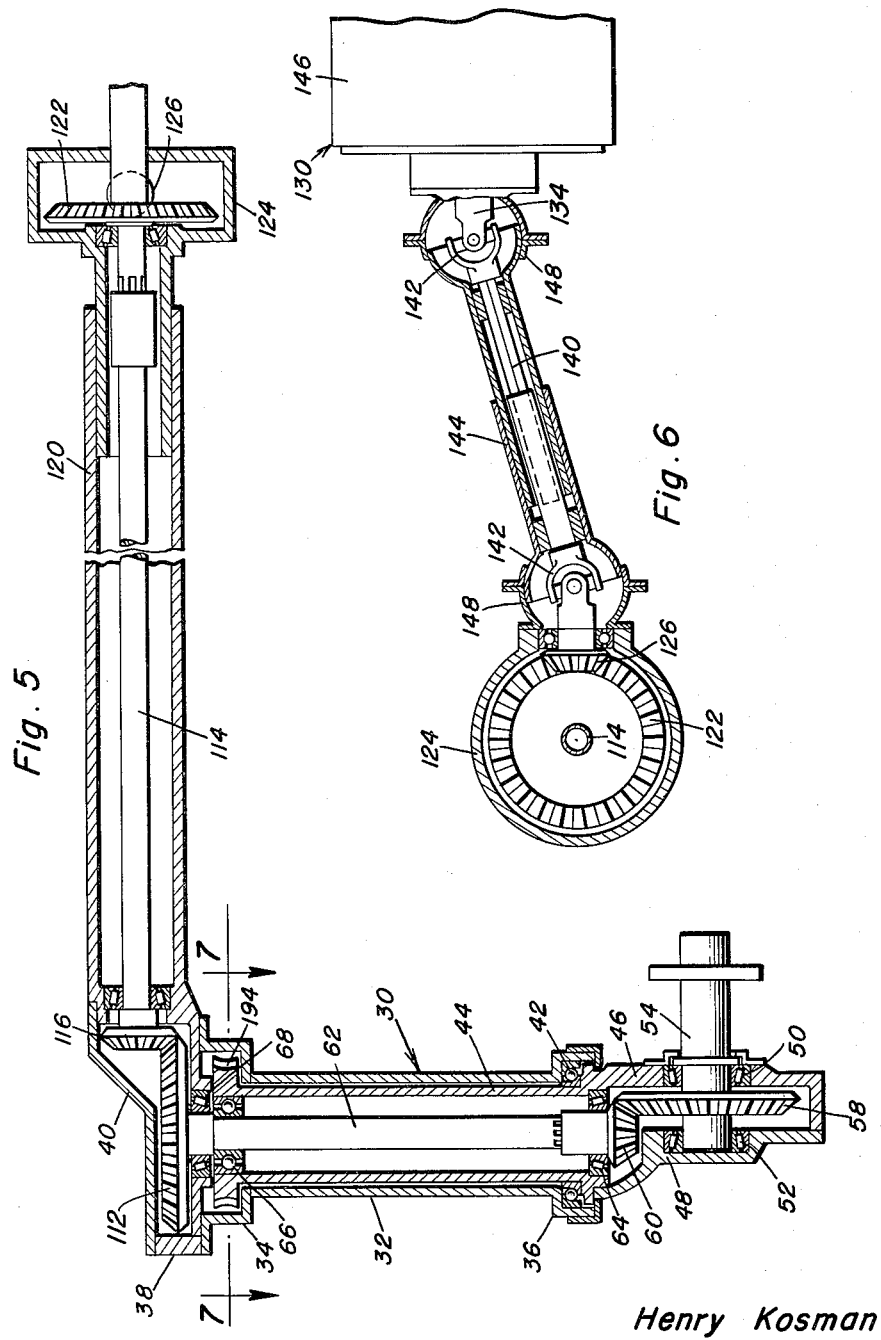

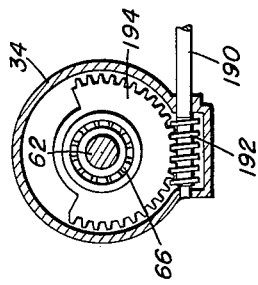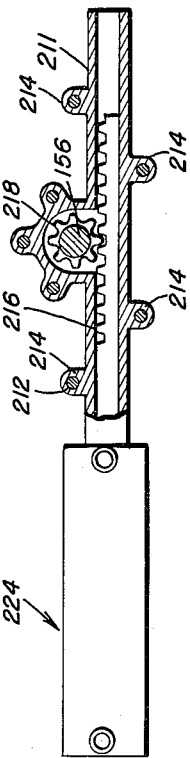

United States Patent Office 2,994,392
Patented Aug. 1, 1961

2,994,392
COMBINED STEERING AND DRIVE UNIT FOR TRACTOR WHEELS
Henry Kosman, 519 Deuel, Fort Morgan, Colo.
Filed Apr. 2, 1956, Ser. No. 575,397
9 Claims. (Cl. 180—6.24)

This invention relates in general to new and useful improvements in vehicles, particularly of the tractor type, and more specifically to an improvement in the mounting and driving of wheels of a vehicle.

During normal farming operations it is highly desirable that the tractor be able to turn in the shortest space possible. This is particularly true at the end of rows and the like where the turning space is wasted. Further, in certain instances, for example on side hill planting, it is desirable that the tractor be able to run slightly sideways.

It is therefore the primary object of this invention to provide an improved tractor which is provided with four supporting wheels, the supporting wheels being steerable whereby control of the tractor is increased to a maximum.

Still another object of this invention is to provide an improved tractor wheel assembly which includes means for driving and steering each wheel of a four wheel tractor, the means being readily controllable by the operator of the tractor.

Still another object of this invention is to provide an improved tractor wheel mounting and steering assembly, the steering assembly being of such a nature whereby the rear wheels may be selectively turned at a different rate from the front wheels so as to provide the desired steering possibilities.

Still another object of this invention is to provide an improved steering assembly for front and rear wheels of a tractor, the steering assembly being of such a nature whereby the rear wheels of the tractor may be selectively turned in different directions with respect to the front wheels.

A further object of this invention is to provide an improved drive assembly for a tractor of the type having four steerable wheels, the drive assembly being of such a nature whereby the rear wheels may be driven at a different rate from the front wheels to facilitate turning of the tractor.

A still further object of this invention is to provide an improved steering assembly for a tractor of the type having four steerable wheels, the steering assembly being of such a nature whereby the rear wheels of the tractor may be selectively turned at a different rate or in a different direction from the front wheels.

Yet a further object of this invention is to provide an improved tractor wheel mounting which is of such a nature whereby the operator of the tractor may selectively increase or decrease the tread of the tractor wheels while remaining seated on the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary perspective schematic view of the means for driving and steering the individual wheels of the tractor, the means for driving the right wheels of the tractor being partially omitted and the right front wheel of the tractor and both the means for driving that wheel and for steering it being omitted;

Figure 2:
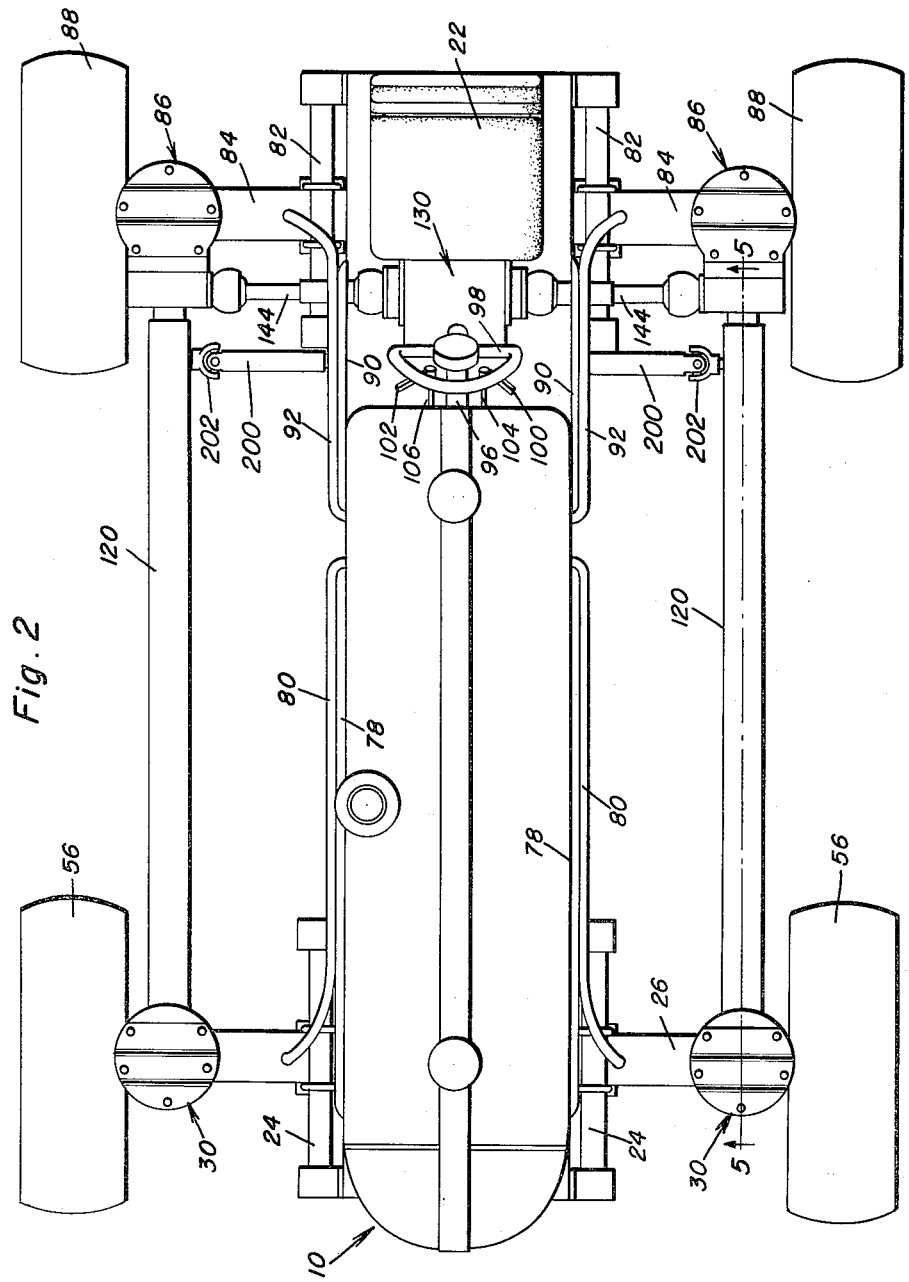
FIGURE 2 is a top plan view of the tractor of FIGURE 1 and shows further the details thereof.
Figure 3:
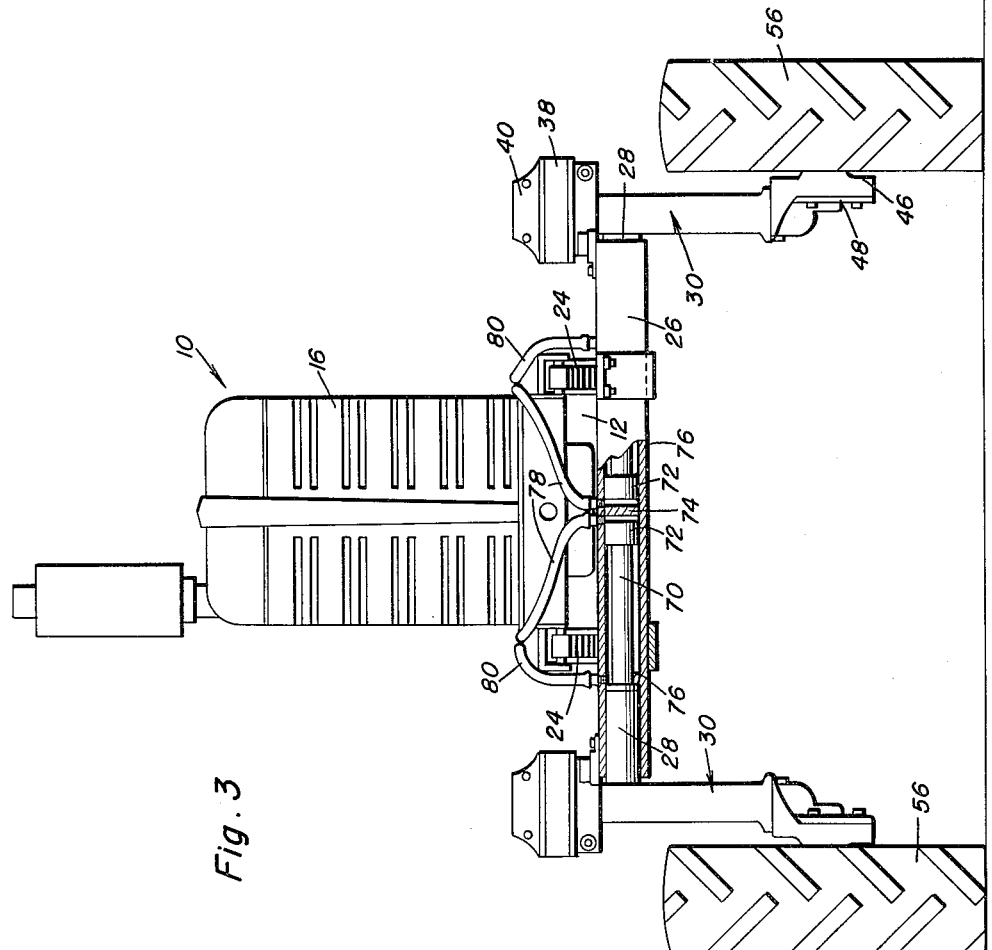
FIGURE 3 is a front elevational view of the tractor of FIGURE 1 with a portion of the front wheel mounting assembly being broken away and shown in section in order to illustrate how the tread of the front wheels may be selectively varied.

FIGURE 5 is an enlarged fragmentary longitudinal vertical sectional view taken through the left front wheel mounting assembly and the drive shaft for the left front wheel along line 5—5 of FIGURE 2, the left front wheel being turned at a 90° angle to the normal direction of travel of the tractor and an intermediate portion of the drive shaft being broken away, the left front wheel being omitted for purpose of clarity;

FIGURE 6 is a fragmentary transverse vertical sectional view showing the manner in which a drive shaft for the left side of the tractor is driven from a gear box;

FIGURE 7 is an enlarged fragmentary horizontal sectional view taken substantially upon the plane indicated by the section line 7—7 of FIGURE 5 and shows the manner in which an axle housing is selectively rotated to steer the wheel carried by such axle housing;

FIGURE 8 is an enlarged fragmentary horizontal sectional view taken through a steering transmission and shows the specific details thereof;

FIGURE 9 is a fragmentary horizontal sectional view taken through the drive element for the steering transmission and shows the specific details thereof; and FIGURE 10 is a fragmentary schematic elevational view of a slightly modified form of drive shaft assembly, the drive shaft assembly incorporating a reduction gear box.

Referring now to the drawings in detail, it will be seen that there is illustrated a tractor which is referred to in general by the reference numeral 10. The tractor 10 includes a frame 12 which supports a motor 14, a radiator assembly 16, a motor housing 18 which includes a gas tank 20 and an operator's seat 22.

Suitably carried by the frame 12 are front springs 24 which in turn are connected to the transverse tubular wheel support member 26. Slidably mounted in opposite ends of the wheel support member 26 and projecting outwardly therefrom are front wheel support shafts 28. Rigidly secured to each shaft 28 in any desired manner and depending therefrom is a front wheel support housing 30.

Referring now to FIGURE 5 in particular, it will be seen that the wheel support housing 30 includes an elongated vertical portion 32 which terminates at its upper end in an enlarged portion 34. The vertical portion 32 also terminates is an enlarged lower portion 36. Secured to the upper end of the upper portion 34 is a gear housing 38. The gear housing 38 is provided with a removable cover plate 40.

Disposed in the enlarged lower portion 36 is a thrust bearing assembly 42 which supports within the wheel support housing 30 an axle housing 44. The axle housing 44 terminates below the wheel support housing 30 in a gear housing 46 having a removable cover 48. Carried by the gear housing 46 is a bearing 50 which is disposed in alignment with a bearing 52 in the cover 48. Suitably journaled in the bearings 50 and 52 is a stub axle 54 on which there is removably mounted a front wheel 56.

Carried by the axle 54 within the gear case 46 is a ring gear 58. Meshed with the ring gear 58 is a pinion gear 60 carried by a vertical drive shaft or axle 62. The axle 62 has the lower parts thereof journaled in a bearing 64 carried by the lower part of the axle housing 44. The upper part of the axle 62 is journaled in a bearing 66 carried by the upper part of the axle housing 44 and in a bearing 68 carried by the gear housing 38. The axle 62 serves to support the upper part of the axle housing 44.

In order that the front wheels 56 may have the tread thereof selectively varied, there is secured to each of the shafts 28 a piston rod 70 which is in turn secured to a piston 72. The tubular support member 26 is divided at its center into two halves by a partition wall 74, the tubular support member 26 forming cylinders 76 on opposite sides of the partition wall 74 for the pistons 72. Connected to each of the cylinders 76 adjacent the partition wall 74 is a hydraulic line 78. Also connected to intermediate portions of the tubular support member 26 at points which define the ends of the cylinders 76 are hydraulic lines 80.

The tractor 10 also includes rear springs 82 which carry a rear tubular support member 84. Supported at opposite ends of the tubular support member 84 are rear wheel support assemblies 86 which are identical to those described above with respect to the front wheels 56. The rear wheel support assemblies 86 carry rear wheels 88. Connected to cylinder portions of the tubular support member 84 which correspond to the cylinder portions 76 are inner hydraulic lines 90 and outer hydraulic lines 92.

The hydraulic lines 78, 80, 90 and 92 are connected to a valve 94 which is in turn connected to the hydraulic system of the tractor 10. Inasmuch as the hydraulic system of the tractor 10 is of the conventional type, a further explanation is not believed necessary.

Suitably carried by the frame 12 is a steering shaft or column 96 carrying a steering wheel 98. Mounted on the steering column 96 are control levers 100 and 102 which are connected by shafts 104 and 106, respectively, to the valve 94 for operating the valve 94 whereby the tread of the wheels 56 and 88 may be selectively varied. The control levers 100 and 102 may be operated separately so as to vary the spacing of the wheels 56 and 88 from the main part of the tractor 10.

Referring once again to FIGURE 4 in particular, it will be seen that the rear wheel mounting assemblies 86 include vertical axles 108. The vertical axles 108 are identical with the vertical axles 62 for the front wheels 56 and are provided at their upper ends with enlarged horizontal ring gears 110. The ring gears 110 are disposed in alignment with ring gears 112 secured to upper ends of the vertical axle 62. Extending between the ring gears 110 and 112 at opposite sides of the tractor 10 are longitudinal drive shafts 114 which terminate at their forward ends in drive pinions 116 meshed with the rings gears 112. The rear ends of the longitudinal drive shafts 114 are provided with drive pinions 118 which are meshed with the ring gears 110. The drive shafts 114 are mounted in a drive shaft housing 120 which extends between the upper portions of the wheel mounting assemblies for the front wheels 56 and the rear wheels 88.

Carried by each of the longitudinal drive shafts 114 adjacent the rear ends thereof is a ring gear 122 which is mounted within a gear case 124 carried by the drive shaft housing 120 intermediate its ends. Carried by the gear case 124 is a drive pinion 126 which is meshed with the ring gear 122.

Connected to the engine 12 is a transmission 128 which is in turn connected to a differential 130. The differential 130 has mounted therein a ring gear 132 connected to stub axles 134. The transmission 128 includes a drive shaft 136 having a pinion gear 138 meshed with the ring gear 132. Extending between the stub axles 134 and the pinion gears 126 are short drive shafts 140 having universal joints 142 at opposite ends thereof. The short drive shafts 140 are of the extensible type and are mounted in extensible tubular housings 144 which extend between the housing 146 of the differential 130 and the gear box 124. The universals 142 are housed in suitable universal housings 148.

Referring now to FIGURE 8 in particular, it will be seen that there is illustrated a steering drive assembly which is referred to in general by the reference numeral 150. The steering drive assembly 150 includes a steering transmission which is referred to in general by the reference numeral 152. The steering transmission 152 is formed of a suitable housing 154 in which there is journaled a main drive shaft 156 which extends transversely of the housing 154 and projects out through opposite sides thereof, the main drive shaft 156 being suitably journaled in bearings 158. Secured to the central part of the main drive shaft 156 is a secondary drive gear 160. A main drive gear 162 is mounted adjacent one end of the main drive shaft 156 and a reversing gear 164 is carried by the main drive shaft 156 adjacent opposite ends thereof. Engaged with the reversing gear 164 is an idler gear 166.

The transmission 152 also includes a secondary drive shaft 168 which is disposed in parallel relation to the main drive shaft 156 and extends out through opposite sides of the transmission housing 154. Slidably mounted on the secondary drive shaft 168 and splined thereto by means of splines 170 is a cluster gear which is referred to in general by the reference numeral 172. The cluster gear 172 includes a main driven gear 174, a secondary driven gear 176 and a reverse driven gear 178. In order that the cluster gear 172 may be selectively shifted along the secondary drive shaft 168, there is provided a shift rod 180 which is slidably mounted in the transmission housing 154 for transverse sliding movement. Carried by the shifting rod 180 are shifting levers 182 which engage opposite ends of the cluster gear 172. As is best illustrated in FIGURE 4, one end of the shift rod 180 is connected to a bell crank 184 which is in turn connected to a control lever 186 by means of a link 188. The control lever 186 is disposed immediately adjacent the operator's seat 22.

Extending along opposite sides of the frame 12 and suitably supported thereby are longitudinal steering shafts 190. The shafts 190 are provided at their forward ends with worm gears 192 which are engaged with worm wheels 194 secured to upper ends of the axle housings 44. The rear ends of the shafts 190 are provided with bevel gears 196 which are meshed with bevel gears 198 carried by transverse drive shafts 200 whose inner ends are connected by means of universal joints 202 to the main drive shaft 156. In order that the rear wheels 88 may be selectively steered, the rear wheel support assemblies 86 include worm rings 204. Meshed with each worm ring 204 is a worm gear 206 carried by a transverse shaft 208. The inner end of each transverse shaft 208 is connected by means of a universal joint 210 to an associated end of the secondary drive shaft 168. The drive shafts 200 and 208 are of the extensible type, like the drive shafts 140 so as to permit the variation in treads of the front wheels 56 and the rear wheels 88.

In order that the steering assembly 150 may be actuated, there is carried by one side of the transmission housing 154 a tubular housing 211 which is supported in place by means of fasteners 212 passing through ears 214. Slidably mounted in the tubular housing 211 is a rack 216 which is meshed with a gear 218. The gear 218 is carried by the main drive shaft 156.

Referring now to FIGURE 8 in particular, it will be seen that the rack 216 is formed as a part of a piston rod 220. The piston rod 220 is part of a hydraulic motor 224 carried by the tubular housing 211. The hydraulic motor 224 also includes a piston 226 which is connected to one end of the piston rod 220. The piston 226 is mounted in a cylinder 228 which has connected to opposite end portions thereof hydraulic lines 230 and 232.

Figure 1:
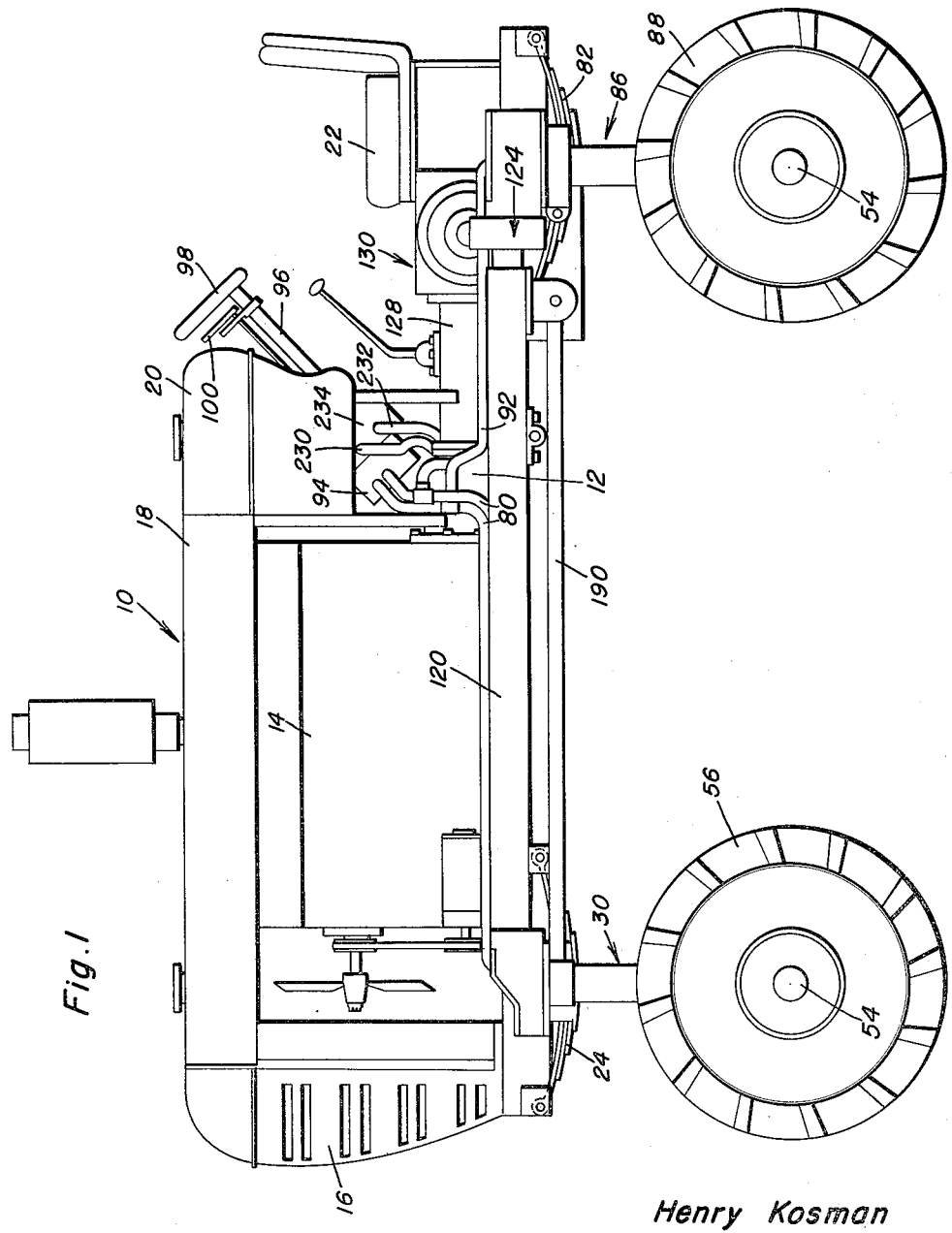
FIGURE 1 is a side elevational view of a tractor employing the wheel mounting assembly which is the subject of this invention.

Referring now to FIGURE 1 in particular, it will be seen that the steering column 96 is connected to a valve 234 which is connected to the hydraulic system of the tractor 10 and which has connected thereto the hydraulic lines 230 and 232. By turning the steering wheel 98, the valve 234 is actuated to control the hydraulic motor 224. As the piston 226 moves in the cylinder 228, the main drive shaft 156 is rotated so as to control the turning of the front wheels 56.

When the gears 162 and 174 are meshed, the front wheels 56 and the rear wheels 88 will be turned the same amount, but in opposite directions so that the tractor 10 will turn very sharply which is desirable at the ends of rows and the like. On the other hand, when the gears 160 and 176 are meshed, the rear wheels 88 will be turned at a lesser degree than the front wheels 56, and in opposite directions so that the rate of turning of the tractor 10 is relatively great, but still less than that permissible with the gears 162 and 174 meshed.

When the gears 164, 166 and 178 are in use, the rear wheels 88 will be turned in the same direction as the front wheels 56 and to the same degree. The tractor 10 will then move sideways, a highly desirable feature in farming, particularly side hill farming.

Referring now to FIGURE 10 in particular, it will be seen that the drive shaft 114 is provided intermediate the ring gear 122 and the pinion gear 118 with a gear box 236. The gear box 236 is in the form of a transmission which will permit the selective driving of the pinions 116 and 118 at the same speed or the pinion 118 at a reduced speed. By driving the pinion 118 at a reduced speed, the rear wheels 88 may be driven at a lesser rate. Thus when the wheels 88 and 56 are turned in the same direction for sidewise movement of the tractor 10, the rear wheels 88 may be driven at a different speed than the front wheels so as to effect turning of the tractor at the same time it moves sideways. A suitable control for the gear box 236 will be provided so that it may be operated by the operator seated on the operator's seat 22.

From the foregoing description of the tractor 10, it will be readily apparent that the tractor 10 is provided with front wheels and rear wheels which are so mounted whereby they may be driven simultaneously either at the same rate or a different rate. Further, the front wheels and the rear wheels are steerable and the control for steering such wheels are such that the wheels may be selectively turned either in the same direction or opposite directions, and selectively at the same rates or at different rates. Thus a full control of the driving and steering of the wheels 56 and 88 is provided. Further, the wheels 56 and 88 are so mounted whereby the tread of the wheels may be selectively varied as desired by the operator of the tractor 10 without leaving his seat 22. Thus the tractor 10 is provided with full controls which may be easily manipulated by the operator of the tractor 10 to produce a maximum efficiency with the tractor 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A four wheel drive and four wheel steering vehicle comprising a frame including front and rear transverse wheel support members, upper gear housings disposed at outer ends of each of said transverse wheel support members, vertical wheel support housings secured to and depending from each of said upper gear housings, a lower gear housing rotatably carried at the lower end of each of said wheel support housings, a horizontally disposed stub axle rotatably journaled in and projecting from each of said lower gear housings, a wheel carried by each of said stub axles, a vertical combined axle housing and steering member rotatably journaled in each of said wheel support housings and rigidly connected to a respective one of said lower gear housings for positioning the axle thereof, a vertical axle rotatably journaled in each of said combined axle housing and steering members, gear means in each of said lower gear housings drivingly connecting together, respective ones or said vertical axles and stub axles, longitudinal drive shaft housings extending between and connecting together front and rear ones of said upper gear housings at opposite ends of said frame, longitudinal drive shafts rotatably journaled in said drive shaft housings, gear means in said upper gear housings drivingly connecting said longitudinal drive shafts to said vertical axles, a drive transmission, transverse drive shafts extending between and drivingly connecting said longitudinal drive shafts to said transmission, a steering unit, individual steering shafts extending between and connecting said combined axle housing and steering members to said steering unit for operation therefrom.

2. The vehicle of claim 1 wherein said transverse wheel support members are formed in transversely extendable sections whereby the tread of said wheels may be varied, said transverse drive shafts and said steering shafts being transversely extensible.

3. The vehicle of claim 1 wherein said steering unit includes a transmission, said transmission having first and second shafts, said first shaft being connected to said steering shafts of said front wheels, said second shaft being connected to said steering shafts of said rear wheels, said transmission including means for selectively varying the effective rate of driving said first and second shafts and for selectively varying the direction of driving said first and second shafts relative to each other.

4. The vehicle of claim 1 wherein said steering unit includes a transmission which is formed of a transmission housing, a main drive shaft rotatably journaled in said transmission housing projecting out of both ends thereof, a secondary drive shaft disposed in parallel relation to said main drive shaft and rotatably journaled in said transmission housing with both ends thereof projecting from said transmission housing, main and secondary drive gears fixed on said main drive shaft in spaced relation, a reversing gear fixed on said main drive shaft, an idler gear carried by said transmission housing enmeshed with said reversing gear, a cluster gear drivingly carried by said secondary drive shaft and being slidable thereon, said cluster gear including main and secondary driven gears and a reverse driven gear, means carried by said transmission housing for shifting and positioning said cluster gear, and a drive unit for said main drive shaft, said steering shafts for said front wheels being connected to said ends of said main shaft, said steering shafts for said rear wheels being connected to said ends of said secondary drive shaft.

5. A steerable vehicle comprising front and rear wheels, first means for steering said front wheels, second means for steering said rear wheels, a transmission connecting said first and second means, said transmission including a transmission housing, a main drive shaft rotatably journaled in said transmission housing and having both ends projecting there out of, said ends of said main drive shaft being connected to said first means, a secondary drive shaft disposed in parallel relation to said main drive shaft and rotatably journaled in said transmission housing with both ends thereof projecting from said transmission housing, said second means being connected to said ends of said secondary drive shaft, main and secondary drive gears fixed on said main drive shaft in spaced relation, a reversing gear fixed on said main drive shaft, an idler gear carried by said transmission housing enmeshed with said reversing gear, a cluster gear drivingly carried by said secondary drive shaft and being slidable thereon, said cluster gear including main and secondary driven gears and a reverse driven gear, means carried by said transmission housing for shifting and positioning said cluster gear, and a drive unit for said main drive shaft.

6. The vehicle of claim 5 wherein said drive unit includes a pinion on said main drive shaft externally of said transmission housing, a rack engaged with said pinion for driving said pinion, and a fluid motor of the double acting type connected to said rack for reciprocating said rack.

7. A steerable vehicle comprising front and rear wheels having steering axes, steering means operatively connected to the front and rear wheels including variable ratio drive means for turning the front and rear wheels in opposite directions about said axes at different relative rates of turning, and positive directional drive means for turning the front and rear wheels in the same direction about said axes at the same rate of turning for constant directional endwise movement of the vehicle and variable ratio transmission means drivingly connected to the front and rear wheels for varying the relative rate of rotation therebetween to further control steering by driving and for propelling the vehicle in a direction controlled by said positive directional drive means.

8. The combination of claim 7, wherein said variable ratio transmission means include a change speed drive means drivingly interconnected between the front and rear wheels.

9. The combination of claim 7 wherein said variable ratio drive means further includes hydraulic actuating means therefor, hydraulically adjustable wheel mounting means for said front and rear wheels for laterally varying wheel spacings, and means for selectively controlling the hydraulic actuating means and said adjustable wheel mounting means.

References Cited in the file of this patent

UNITED STATES PATENTS

| | | |
|---|---|---|
| 1,231,655 | Schmidt | July 3, 1917 |
| 1,255,775 | Mueller | Feb. 5, 1918 |
| 1,276,250 | Mueller | Aug. 20, 1918 |
| 1,512,562 | Radies | Oct. 21, 1924 |
| 1,681,893 | Barshell | Aug. 21, 1928 |
| 1,731,558 | Wright | Oct. 15, 1929 |
| 1,866,393 | Brooks | July 5, 1932 |
| 2,107,072 | Herrington | Feb. 1, 1938 |
| 2,376,419 | Cole | May 22, 1945 |
| 2,400,505 | Hadglen | May 21, 1946 |
| 2,404,639 | Lane | July 23, 1946 |
| 2,711,222 | Block | June 21, 1955 |
| 2,722,199 | Blanchette et al. | Nov. 1, 1955 |

FOREIGN PATENTS

| | | |
|---|---|---|
| 570,007 | Germany | Feb. 10, 1933 |
| 451,813 | Great Britain | Aug. 12, 1936 |